(12) United States Patent
Kim et al.

(10) Patent No.: US 8,258,657 B2
(45) Date of Patent: Sep. 4, 2012

(54) VIBRATION MOTOR

(75) Inventors: Yong-Jin Kim, Suwon-si (KR);
Hwa-Young Oh, Seoul (KR); Jee-Sung Lee, Suwon-si (KR); Seok-Jun Park, Suwon-si (KR); Je-Hyun Bang, Suwon-si (KR); Kwang-Hyung Lee, Suwon-si (KR); Kyoung-Ho Lee, Suwon-si (KR); Jun-Kun Choi, Suwon-si (KR); Ki-Suk Woo, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 206 days.

(21) Appl. No.: 12/760,116

(22) Filed: Apr. 14, 2010

(65) Prior Publication Data

US 2011/0074229 A1 Mar. 31, 2011

(30) Foreign Application Priority Data

Sep. 29, 2009 (KR) ........................ 10-2009-0092420

(51) Int. Cl.
*H02K 33/00* (2006.01)
(52) U.S. Cl. .......................................... 310/28; 310/29
(58) Field of Classification Search .................... 310/21, 310/29, 28
See application file for complete search history.

(56) References Cited

U.S. PATENT DOCUMENTS

| | | | | |
|---|---|---|---|---|
| 3,751,899 A | * | 8/1973 | Tsuruishi | 368/157 |
| 5,263,782 A | * | 11/1993 | Yageta et al. | 400/124.23 |
| 5,682,132 A | * | 10/1997 | Hiroyoshi et al. | 340/407.1 |
| 6,946,756 B2 | * | 9/2005 | Shimizu et al. | 310/12.15 |
| 7,053,507 B2 | * | 5/2006 | Kobayashi et al. | 310/36 |

* cited by examiner

*Primary Examiner* — Burton Mullins
(74) *Attorney, Agent, or Firm* — McDermott Will & Emery LLP

(57) ABSTRACT

A vibration motor is disclosed. In accordance with an embodiment of the present invention, the vibration motor includes a base, a vibrator, which reciprocates in the base, a protruding part, which is formed on at least one of the base and the vibrator, and an elastic body, which is interposed between the base and the vibrator and has a through-part formed therein and in which the protruding part is inserted into the through-part and the elastic body is coupled to the base or the vibrator by caulking or bending the protruding part which is protruded through the through-part. Thus, the vibration motor can have a uniform resonant frequency characteristic since a spring is coupled by way of caulking or bending.

5 Claims, 7 Drawing Sheets

VIBRATION MOTOR

CROSS-REFERENCE TO RELATED APPLICATIONS

This application claims the benefit of Korean Patent Application No. 10-2009-0092420, filed with the Korean Intellectual Property Office on Sep. 29, 2009, the disclosure of which is incorporated herein by reference in its entirety.

BACKGROUND

1. Technical Field

The present invention is related to a vibration motor.

2. Description of the Related Art

A vibration motor is a part that converts electrical energy into mechanical vibrations by using the principle of generating electromagnetic forces, and is commonly installed in a mobile phone to generate a soundless vibrating alert. With the rapid expansion of mobile phone markets and increased functionalities added to the mobile phone, mobile phone parts are increasingly required to be smaller and better. As a result, there has been an increased demand for the development of a new structure of vibration motor that can overcome the shortcomings of conventional vibration motors and effectively improve the quality.

As mobile phones having a bigger LCD screen have become popular for the past few years, there have been an increasing number of mobile phones adopting a touch-screen method, by which vibration is generated when the screen is touched. Touch-screens particularly require that the vibration motor has a greater durability due to a greater frequency of generating vibration in response to the touch compared to the vibration bell for incoming calls and that the vibration has a faster response to the touch made on the touch screen, in order to provide a user a greater satisfaction from sensing the vibration when touching the touch screen.

Commonly used to overcome the drawbacks of shorter life time and slower responsiveness in the vibrating functionality of touchscreen phones is a linear vibration motor, does not use the principle of rotating of a motor but uses an electromagnetic force having a predetermined resonant frequency to generate vibrations by use of a spring installed in the vibration motor and a mass coupled to the spring. Here, the electromagnetic force is generated through an interactive reaction between a magnet, which is placed on the moving mass, and a direct or alternating current having a particular frequency flowing through a coil, which is placed on a stationary part.

The spring, which is an essential part of the linear vibration motor, is commonly coupled to the linear vibration motor by way of welding. However, it is difficult to maintain uniform quality of welding. In other words, it is difficult to maintain the quality during the production process because there are many variables, for example, the change in energy, the location and size of welding, and the surface smoothness and adhesion area between the spring and a bracket during the welding, which can cause a change in resonant frequency of the linear vibration motor.

SUMMARY

The present invention provides a vibration motor that has a uniform resonant frequency characteristic by making the quality of coupling of a spring uniform.

An aspect of the present invention provides a linear vibrator that includes a base, a vibrator, which reciprocates in the base, a protruding part, which is formed on at least one of the base and the vibrator, and an elastic body, which is interposed between the base and the vibrator and has a through-part formed therein and in which the protruding part is inserted into the through-part and the elastic body is coupled to the base or the vibrator by caulking or bending the protruding part which is protruded through the through-part.

The elastic body can include a leaf spring, which includes a frame and an elastic member. The frame has a through-part formed therein, the protruding part is inserted into the through-part, and the elastic member is extended from an inner side of the frame.

The through-part can be a through-hole formed in the frame or an indentation opened toward a side surface of the frame.

The leaf spring can be provided in a pair, and each of the pair of the leaf springs can be interposed between the base and either end of the vibrator.

The base can include a pair of supporting parts facing each other, and the pair of leaf springs can be interposed between the vibrator and the pair of supporting parts, respectively.

The vibration motor can further include a cylinder-shaped coil unit, which is disposed on the base, and the vibrator can further include a magnet and a weight, in which the magnet is inserted into the coil unit and the weight is coupled to the magnet.

Additional aspects and advantages of the present invention will be set forth in part in the description which follows, and in part will be obvious from the description, or may be learned by practice of the invention.

DETAILED DESCRIPTION

The features and advantages of this invention will become apparent through the below drawings and description.

Figure 1:
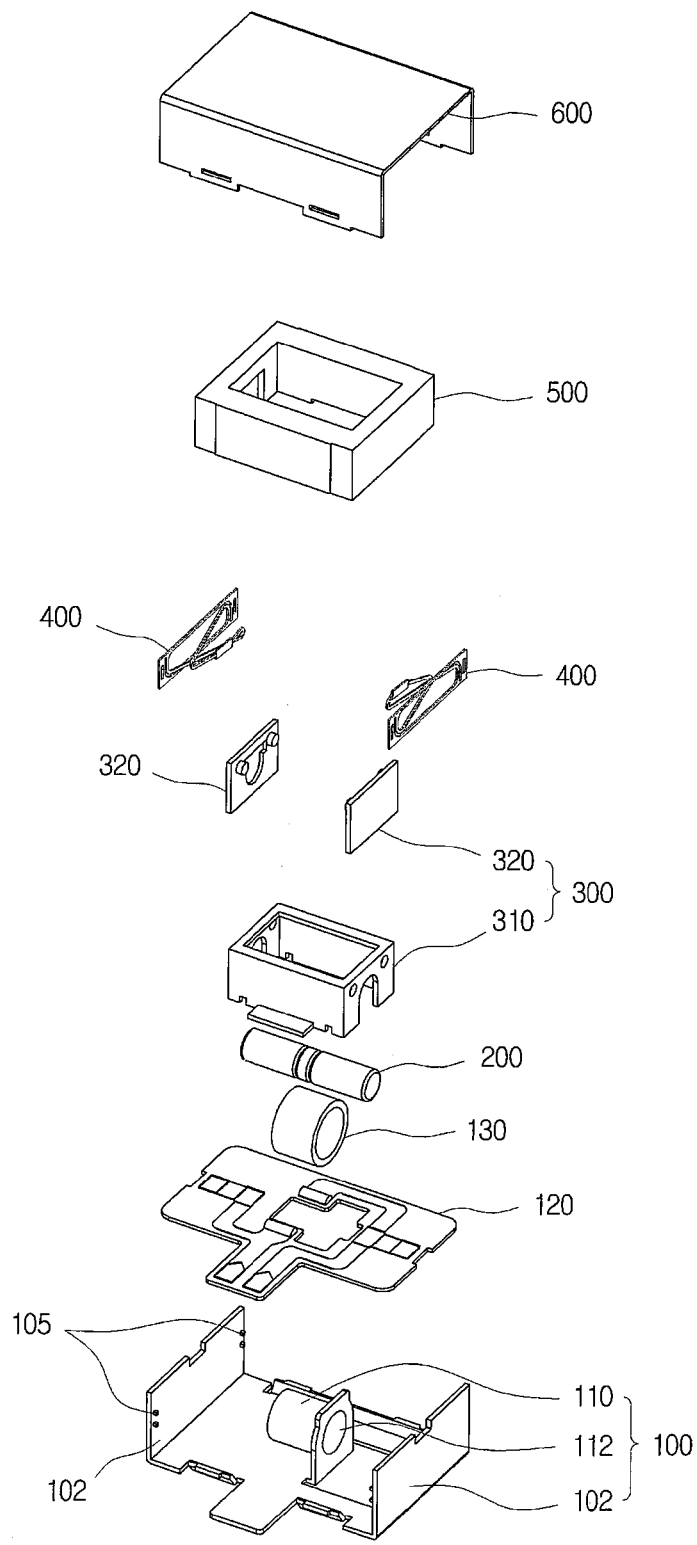
FIG. 1 is an exploded perspective view of a vibration motor in accordance with an embodiment of the present invention.
Figure 2:
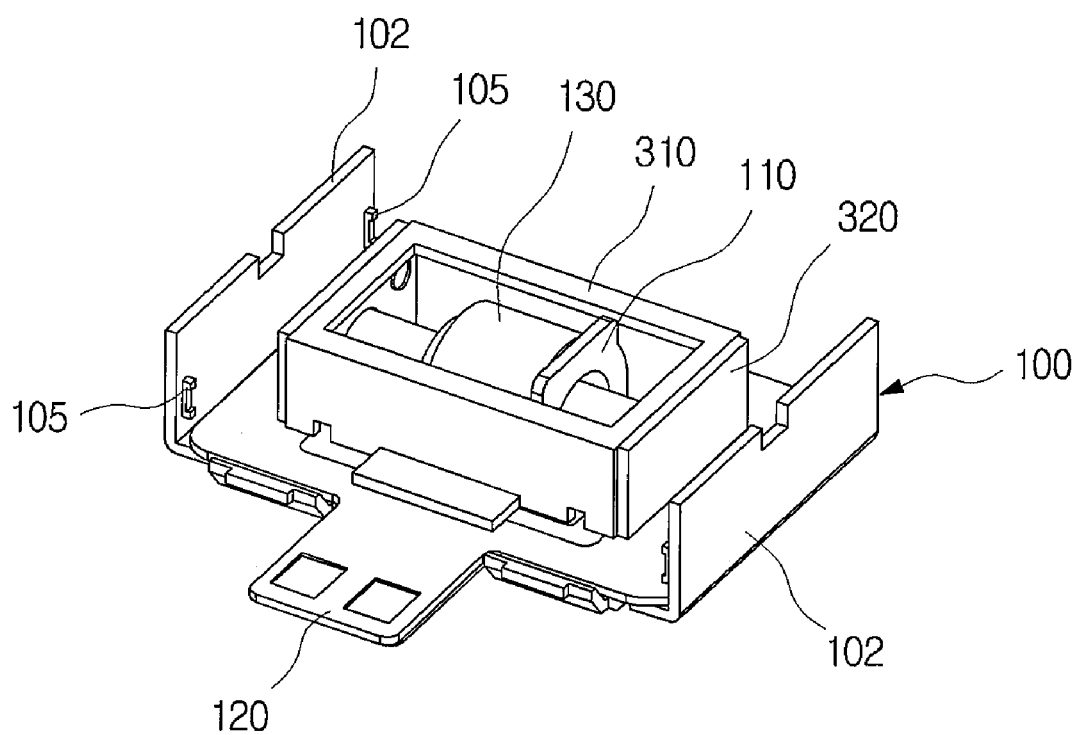
FIG. 2 is a perspective view illustrating assembling of a vibrator in a vibration motor in accordance with an embodiment of the present invention.

FIG. 1 is an exploded perspective view of a vibration motor in accordance with an embodiment of the present invention, and FIG. 2 is a perspective view illustrating assembling of a vibrator in a vibration motor in accordance with an embodiment of the present invention.

A vibration motor in accordance with an embodiment of the present invention includes a base 100, a vibrator, a protruding part 105 and an elastic body 400. A coil unit 130 is coupled to the base 100, and the vibrator is constituted by a magnet 200 and a weight 500.

The base 100, in which the components of the vibration motor are housed, has a space that supports the components of the vibration motor. In this embodiment, the coil unit 130, which will be described later, is disposed at the center of the base 100, and a pair of supporting parts 102 facing each other are formed on either end of the base 100.

Specifically, a bobbin 110 that can support the coil unit 130 is formed on the base 100. The bobbin 110 can have a cylindrical shape having a hollow part 112 formed therein. Also, the pair of supporting parts 102 can be formed in the shape of a pair of partition walls facing each other and formed on either end of the base 100. Meanwhile, a case 600 covers the base 100 and forms the exterior of the vibration motor.

The protruding part 105, which is formed on at least one of the base 100 and the vibrator, is a part to which the elastic body 400, which will be described later, is coupled. In this embodiment, the protruding part 105 where a leaf spring, which will be described later, is assembled is formed on a pair of partition walls, which face each other and forms the pair of supporting parts 102. As a result, the position of coupling of the elastic body 400 can be precisely determined by the protruding part 105, and thus deviation in resonant frequency caused by deviation in coupling position of the elastic body 400 can be prevented.

The coil unit 130 generates an electromagnetic force that is needed to generate vibrations and has a cylindrical shape having a hollow part formed therein with a coil being wound on the cylindrical shape. By inserting the bobbin 110 into the hollow part of the coil unit 130, the coil unit 130 can be installed on the base 102.

A substrate 120 is a part that provides electrical connection to the coil unit 130. A circuit pattern can be formed on one surface of the substrate 120. The substrate 120 is installed on the base 102, and the bobbin 110 can be exposed toward the upper side of the substrate 120 through an opening formed at the center of the substrate 120.

The vibrator is a part that reciprocates in the base 100 and can be vibrated by the electromagnetic force of the coil unit 130. The vibrator of this embodiment includes a magnet 200 and a weight 500.

The magnet 200 is made of a magnetic material that receives force from the electromagnetic force of the coil unit 130 and has a cylindrical shape extended lengthwise. By being inserted into the hollow part of the bobbin 110, the magnet 200 can move horizontally in the hollow part of the bobbin 110.

Also, as illustrated in FIG. 2, a yoke 300 can prevent the leakage of magnetic flux of the magnet 200 and converge the magnetic flux. Particularly, the yoke 300 includes a cover yoke 310 and a back yoke 320. The cover yoke 310 can be shaped as a rectangular cuboid generally surrounding the magnet 200. The back yoke 320 can be coupled to both ends of the magnet 200 and the cover yoke 310.

The weight 500 is a rectangular cuboid generally surrounding the yoke 300. The weight 500 is installed outside the magnet 200 and the yoke 300 and can generate strong vibrations through repetitive horizontal movement with the magnet 200.

The elastic body 400 is a part that elastically supports the vibrator in such a way that the vibrator can resonate. For this, the elastic body 400 is interposed between the base 100 and the vibrator.

Figure 3:
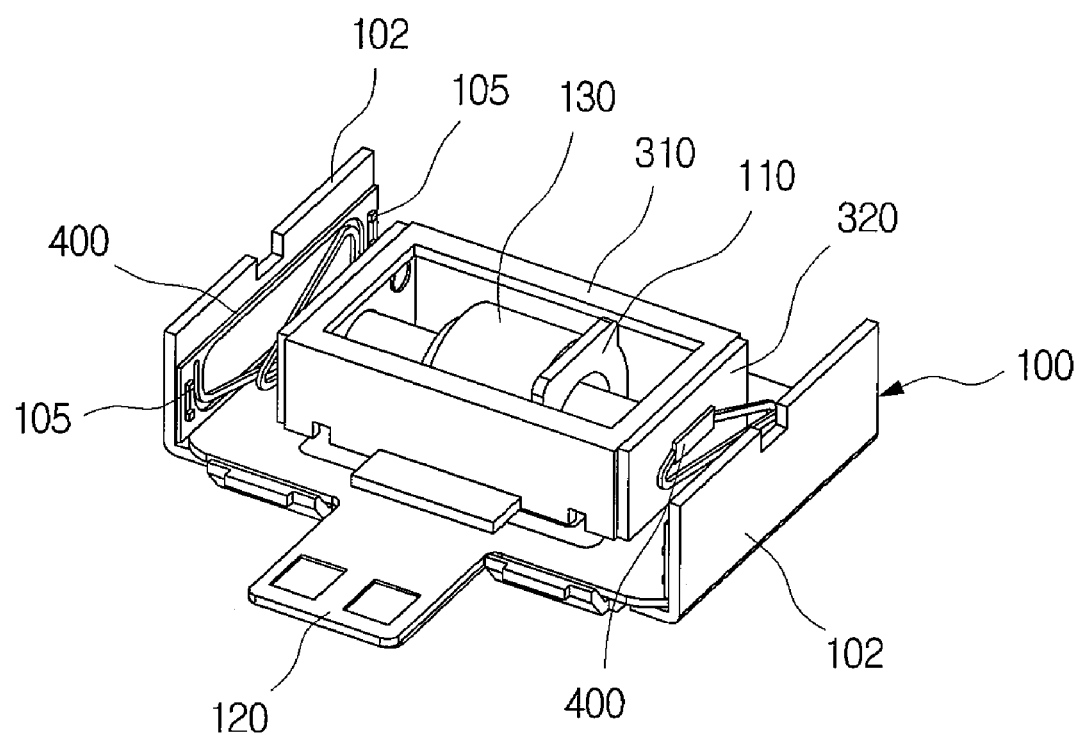
FIGS. 3 and 4 are perspective views illustrating assembling of a leaf spring in a vibration motor in accordance with an embodiment of the present invention.
Figure 4:
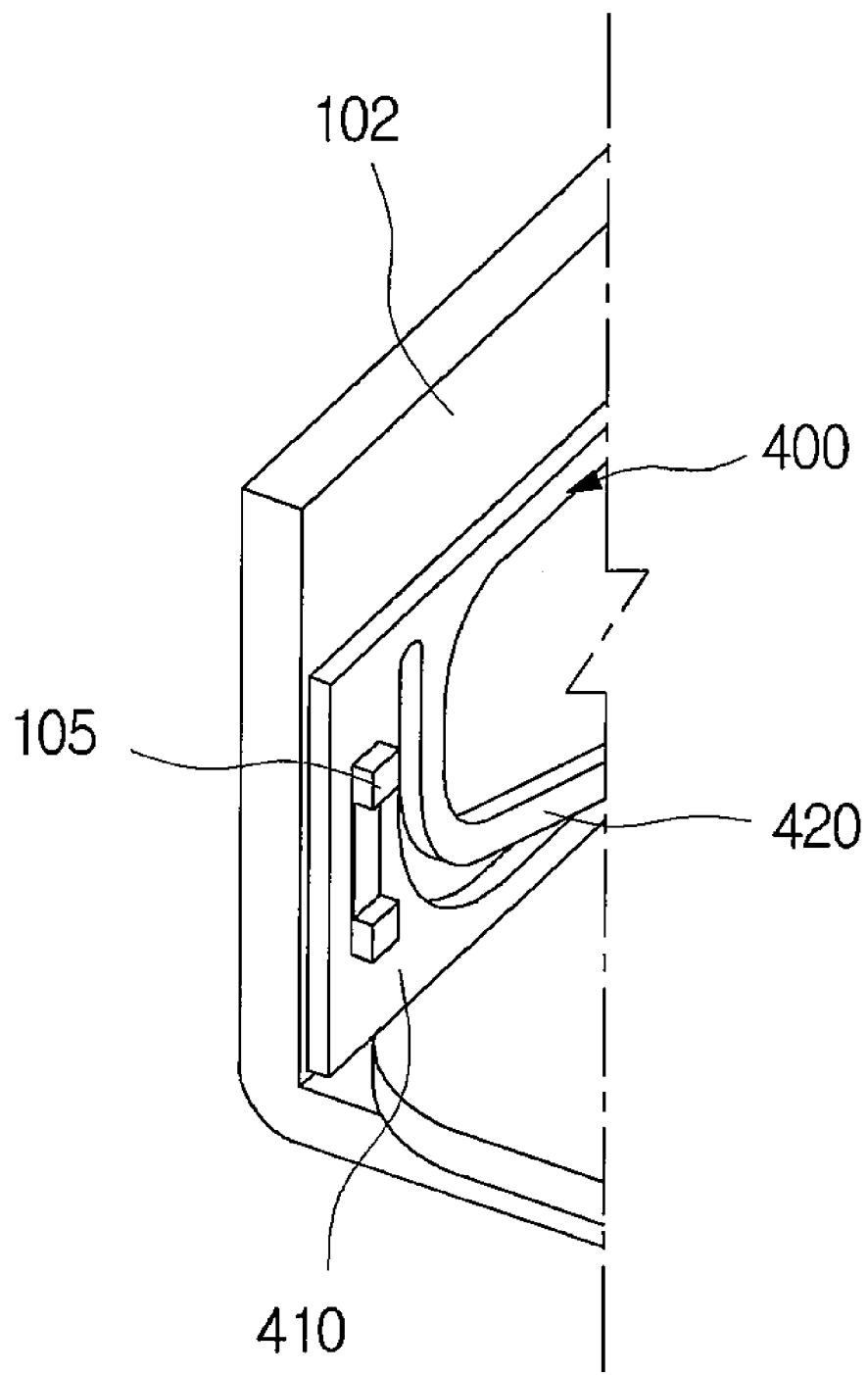

FIGS. 3 and 4 are perspective views illustrating assembling of a leaf spring in a vibration motor in accordance with an embodiment of the present invention.

As illustrated in FIGS. 3 and 4, the elastic body 400 of this embodiment is interposed between the supporting part 102 of the base 100 and either end of the vibrator, respectively. Also, the elastic body 400 is a leaf spring that has a frame 410 having a through-hole, into which the protruding part 105 of the base 100 is inserted, formed therein and an elastic member 420 extended from the inner side of the frame 410. By inserting the protruding part 105 into the through-hole to dispose the leaf spring, the leaf spring can be correctly assembled.

In the present embodiment, the elastic body 400 can be coupled to the base 100 by caulking the protruding part 105.

Figure 5:
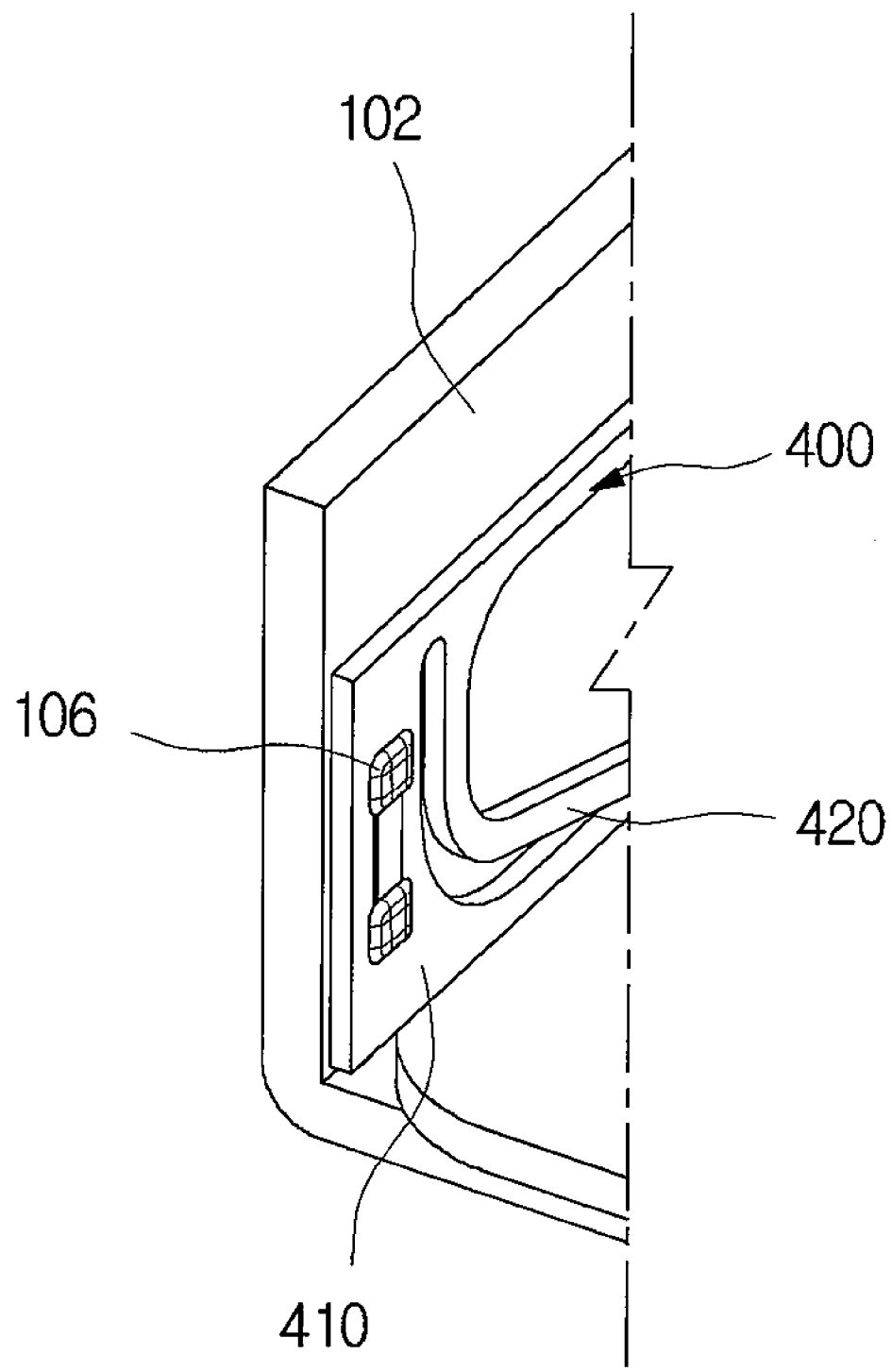
FIGS. 5 to 7 are perspective views illustrating coupling of a leaf spring in a vibration motor in accordance with an embodiment of the present invention.
Figure 6:
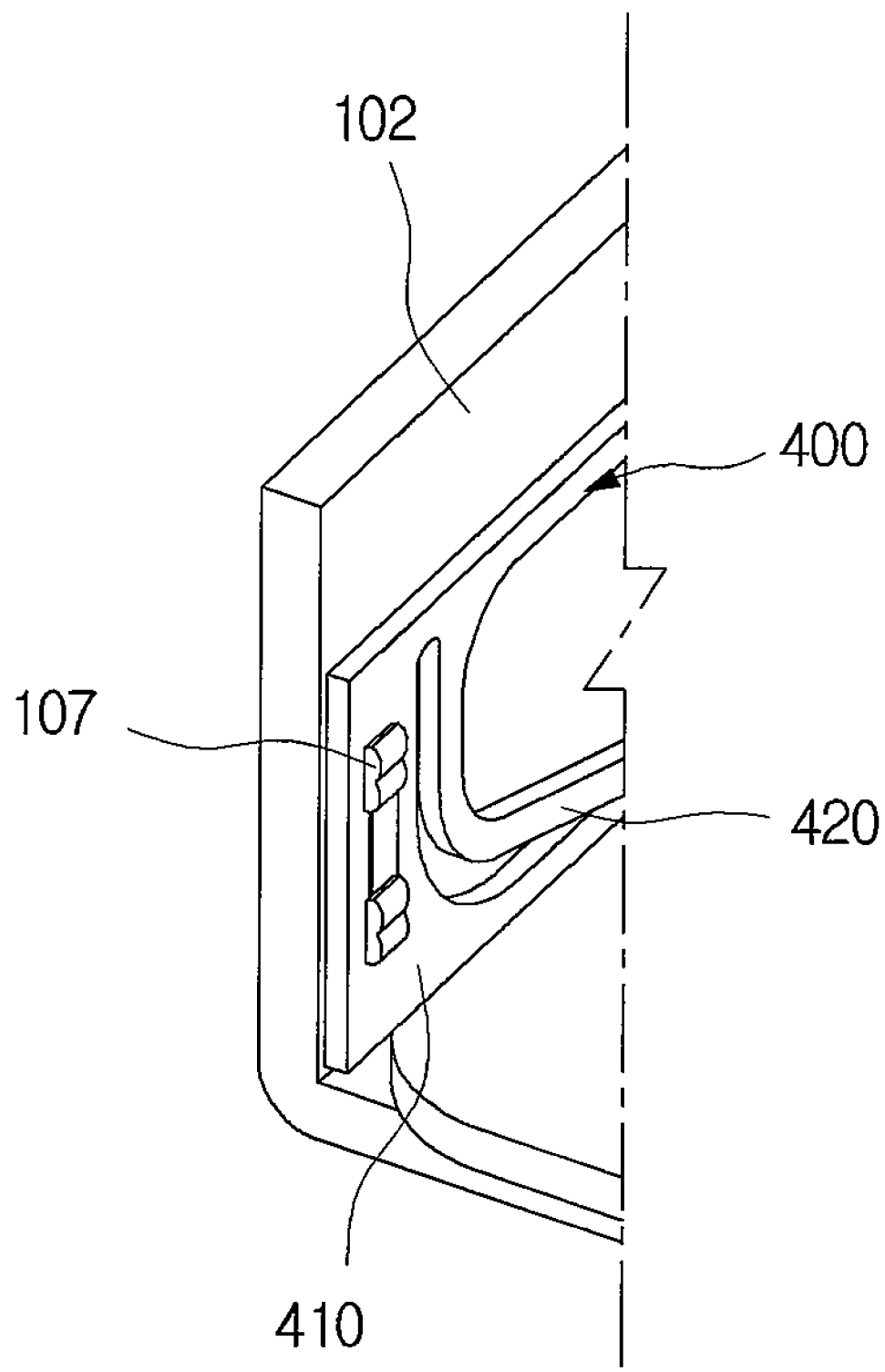
Figure 7:
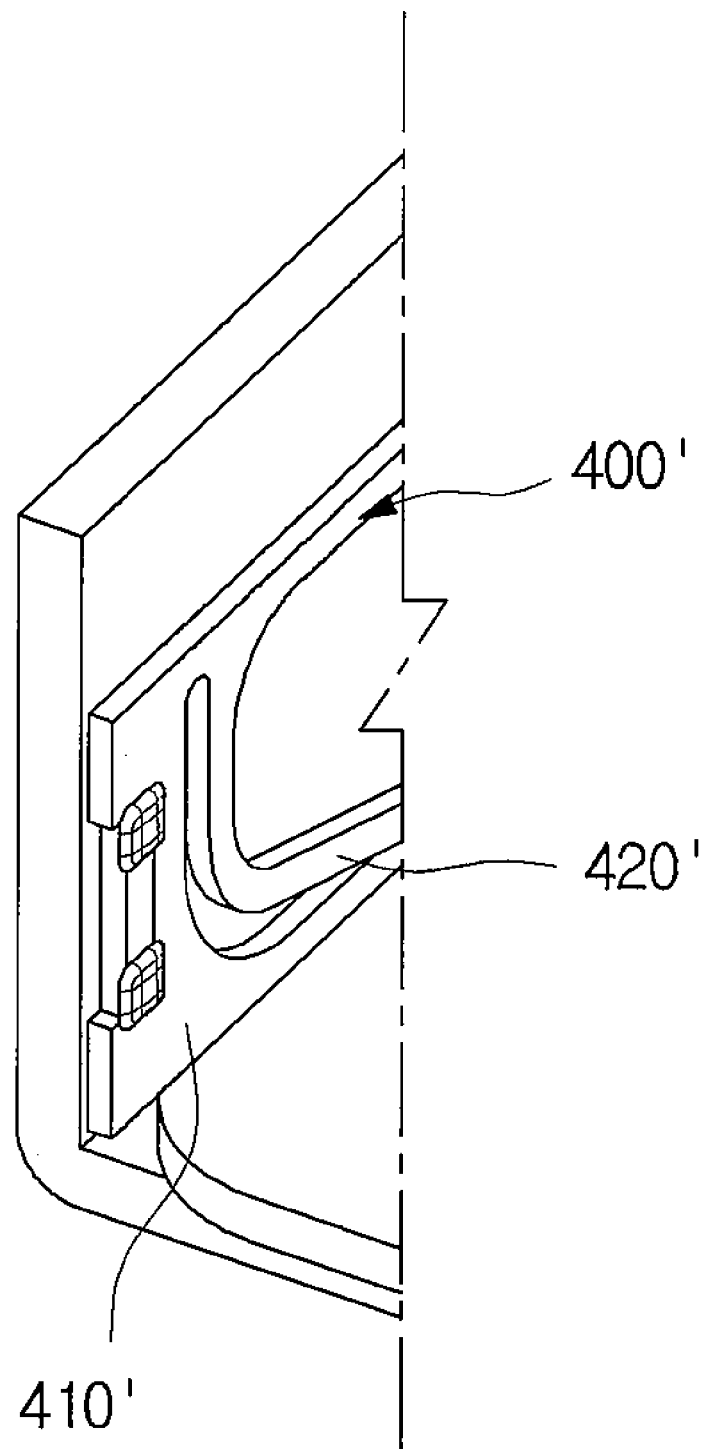

FIGS. 5 to 7 are perspective views illustrating coupling of a leaf spring in a vibration motor in accordance with an embodiment of the present invention.

As illustrated in FIGS. 5 and 6, since the frame 410 of the leaf spring has a through-hole formed therein, the leaf spring can be coupled by caulking the protruding part 105, which is protruded through the through-hole. Also, as illustrated in FIG. 7, since the leaf spring has an indentation opened toward a side surface of a frame 410', the leaf spring can be coupled by caulking the protruding 105, which is protruded through the indentation.

Since the elastic body 400 is coupled by way of caulking, the size and shape of protruding parts 106 and 107 can be maintained uniform, unlike coupling by way of welding. Moreover, since no additional member is used for coupling, the total mass can be maintained constant.

Therefore, the elastic body 400 can be coupled to the vibration motor with a stable quality so that the vibration motor can have a uniform resonant frequency characteristic. Moreover, since a more complicated welding process is replaced by a simple caulking process, which is simply performed by compressing or hammering, the cost of investment for the development and maintenance of precision welding machines can be saved, and the process of coupling a spring can be simplified, thus improving the workability.

Although this embodiment presents an example of coupling the elastic body 400 through caulking the protruding part 105, it is also possible that the coupling of the protruding part 105 to the elastic body 400 can be implemented by bending the protruding part 105 after assembling the elastic body 400.

In accordance with an embodiment of the present invention, a vibration motor can have a uniform resonant frequency characteristic since a spring is coupled by way of caulking or bending.

While the spirit of the present invention has been described in detail with reference to a particular embodiment, the embodiment is for illustrative purposes only and shall not limit the present invention. It is to be appreciated that those skilled in the art can change or modify the embodiment without departing from the scope and spirit of the present invention.

What is claimed is:

1. A vibration motor comprising:
   a base;
   a vibrator reciprocating in the base;
   a protruding part formed on at least one of the base; and
   an elastic body interposed between the base and the vibrator and having a through-hole formed therein, the protruding part being inserted into the through-hole, the elastic body being coupled to the base or the vibrator by caulking or bending the protruding part which is protruded through the through-hole,
   wherein the elastic body comprises a leaf spring, the leaf spring comprising a frame and an elastic member the frame having the through-hole formed therein, the protruding part being inserted into the through-hole, the elastic member being extended from an inner side of the frame.

2. The vibration motor of claim 1, wherein the through-hole is a hole formed in the frame or an indentation opened toward a side surface of the frame.

3. The vibration motor of claim 1, wherein the leaf spring is provided in a pair, and each of the pair of the leaf springs is interposed between the base and either end of the vibrator.

4. The vibration motor of claim 3, wherein the base comprises a pair of supporting parts facing each other, and the pair of leaf springs are interposed between the vibrator and the pair of supporting parts, respectively.

5. The vibration motor of claim 1, further comprising a cylinder-shaped coil unit disposed on the base,
   wherein the vibrator further comprises a magnet and a weight, the magnet being inserted into the coil unit, the weight being coupled to the magnet.

* * * * *